United States Patent Office 3,477,288
Patented Nov. 11, 1969

3,477,288
TESTING APPARATUS AND METHOD
FOR SHEET MATERIAL
Zdeněk Krčál, Gottwaldov, and Eduard Mück and Jaroslav Krčmár, Otrokovich, Czechoslovakia, assignors to Statní Vyzkumny Ustav Kozedelny, Gottwaldov, Czechoslovakia
Filed Oct. 19, 1967, Ser. No. 676,513
Claims priority, application Czechoslovakia, Oct. 21, 1966, 6,690/66
Int. Cl. G01l 5/04; G10k 11/00
U.S. Cl. 73—159
8 Claims

ABSTRACT OF THE DISCLOSURE

Leather or leatherlike sheet material is tested for suppleness while its edge is clamped between perforated plates by directing acoustic oscillations against a first exposed face of the material and measuring the intensity of the attenuated oscillations emitted from the second exposed face. The oscillations are generated by an electroacoustical transducer in an exponential horn directed toward the first face, and sensed by a microphone in a chamber closed by the second face. The sensed attenuation is a measure of the suppleness of the sheet material.

BACKGROUND OF THE INVENTION

This invention relates to the testing of flexible leather and similar pliable sheet material employed in the making of shoes, and particularly to a method and apparatus for measuring the suppleness of such sheet material.

Known methods of testing the suppleness of leather and like materials determine the flexural stiffness of a tested piece by measuring the deflection of the piece under a fixed load or by measuring the load required to produce a fixed deflection. The known methods do not produce reliable or even reproducible results with sheet material of natural origin such as hides and soft leather, partly because of the fiber structure of the natural materials, and it is difficult to correlate results obtained on tested pieces of different materials or of different thickness. Many of the known testing methods are time-consuming and others require specimens of a fixed shape to be cut from the tested sheet.

The primary objects of this invention are the provision of a non-destructive, rapid, and reliable method of determining the suppleness of leather and similar sheet material, and the provision of apparatus for performing the method.

SUMMARY OF THE INVENTION

In one of its aspects, this invention resides mainly in a method of testing leather and like sheet material for suppleness in which one major face of a piece of the sheet material is exposed to acoustic oscillations in a first body of fluid, the oscillations having a frequency between 10 and 10,000 cycles per second. The other major face of the piece is exposed to a second, separate body of fluid to which the oscillations of the first body are transmitted by the tested piece in attenuated condition. The attenuated oscillations are monitored, and the attenuation of the oscillations by the tested piece is a measure of the suppleness of the latter.

With many sheet materials employed in the shoe industry, the suppleness can be determined most sensitively with acoustic oscillations having a frequency near 200 cycles per second, and sinusoidal exciting oscillations are preferred though not essential.

The apparatus employed provides a clamping device which holds the edges of a tested piece in a fixed position while a portion of each face of the test piece is exposed. The clamping device includes two clamping members whose faces extend in respective, substantially parallel planes, and which are formed with respective apertures therethrough transverse of said faces. An actuating mechanism moves the clamping members toward and away from a position in which the apertures are aligned and the faces of the clamping members are closely juxtaposed for clamping a tested sheet material therebetween while exposed faces of the material extend across the apertures. Walls define first and second chambers with the two exposed face portions respectively, and an electroacoustical transducer is provided in each chamber.

The first chamber may have the shape of a horn closed at its wide end by an exposed face portion of the tested piece and equipped with a driver at its small end. The second chamber is equipped with a microphone. An oscillator or other generator feeds alternating voltage to the driver in the first chamber, and the microphone is connected to an indicating device which responds to the alternating voltage output of the microphone to produce a perceptible indication of the oscillation intensity in the second chamber.

Other features, additional objects, and many of the attendant advantages of this invention will readily be appreciated from the following detailed description of a preferred embodiment when considered in connection with the attached drawing.

DETAILED DESCRIPTION OF THE PREFERRED EMBODIMENT

Figure 1:
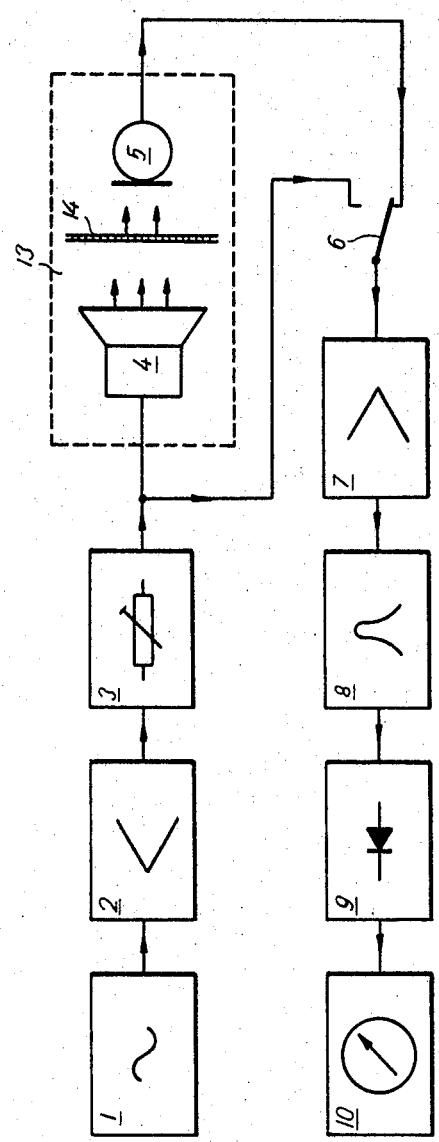
FIG. 1 is a circuit diagram of an apparatus of the invention for testing leather and like sheet materials for suppleness.

As shown in FIG. 1, the apparatus of the invention includes an oscillator 1 whose sinusoidal output signal is amplified by an amplifier 2. The amplifier signal is modified in a control unit 3 and normally fed to a driver 4 of a loudspeaker. The acoustic oscillations generated by the speaker in the body of air 13 which separates the driver 4 from the tested piece 14 are transmitted by the piece 14 in attenuated form to a microphone 5.

In the illustrated position of the single-pole double-throw switch 6, the output of the microphone 5 is fed through an amplifier 7, a low-pass filter 8, and a rectifier 9 to a measuring instrument 10, a millivoltmeter, which produces a visible indication of the intensity of the oscillations transmitted by the tested piece 14 to the microphone 5.

When the switch 6 is shifted to its non-illustrated position, the output of the amplifier 2 as modified by the control unit 3 is fed directly to the amplifier 7 to provide a calibrating signal for the millivoltmeter 10, so that the attenuation produced by the tested piece 14 may be read directly from a suitably calibrated scale of the instrument 10.

Figure 2:
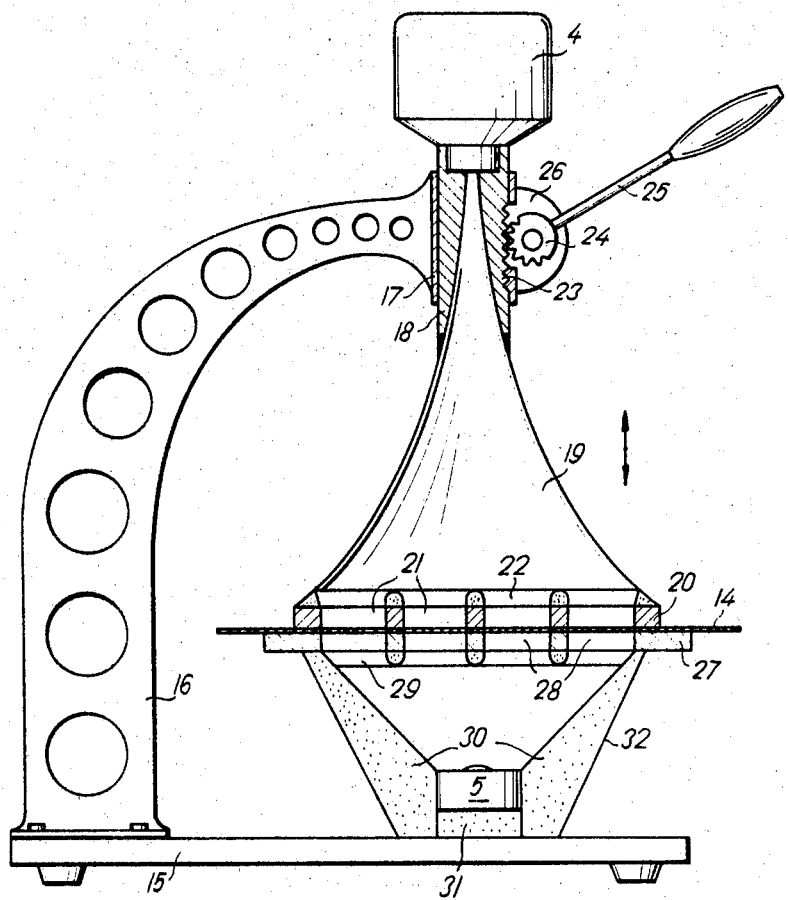
FIG. 2 shows the portion of the apparatus of FIG. 1 indicated in the diagram by a rectangle of broken lines in elevational section.

The structural elements of the circuit enclosed in a rectangle of broken lines in FIG. 1 are shown in elevational section in FIG. 2. A horizontal base plate 15 carries a rigid upright bracket 16 equipped with a vertical guide sleeve 17 at its free upper end. The small end 18 of a downwardly directed exponential horn 19 is slidably guided in the sleeve 17. The driver 4 is mounted on the small end 18.

The wide lower end of the horn 19 is attached to an upper clamping plate 20 having wide openings 21 by a ring 22 of acoustical insulating material. A rack 23 on the small horn end 18 meshes with a pinion 24 equipped with an operating arm 25 and journaled in a lug 26 of the bracket 16.

A lower clamping plate 27 having openings 28 aligned with the corresponding openings 21 of the plate 20 is mounted by means of a ring 29 of acoustical insulating material on the upper rim of an upwardly flaring frustoconical shell 32 whose conically tapering wall is internally lined with sound absorbing material 30. The microphone 5 is mounted on the bottom of the shell 32 on a shock absorbing foam rubber pad 31.

When the pinion 24 is turned by means of the arm 25, the horn 19 with the driver 4 and the clamping plate 20 is moved up or down as indicated by a double arrow. In operating the apparatus of the invention, the ring 20 is raised, a piece 14 of leather or other sheet material is placed on the lower clamping plate 27, and the horn 19 is lowered to clamp the edges of the piece 14 between the two clamping plates. The driver 4 is excited, and the intensity of the attenuated oscillations transmitted to the microphone 5 through the sheet material piece 14 and the air in the two chambers within the horn 19 and the shell 32 is indicated by the resulting reading on the millivoltmeter 10.

Figure 3:
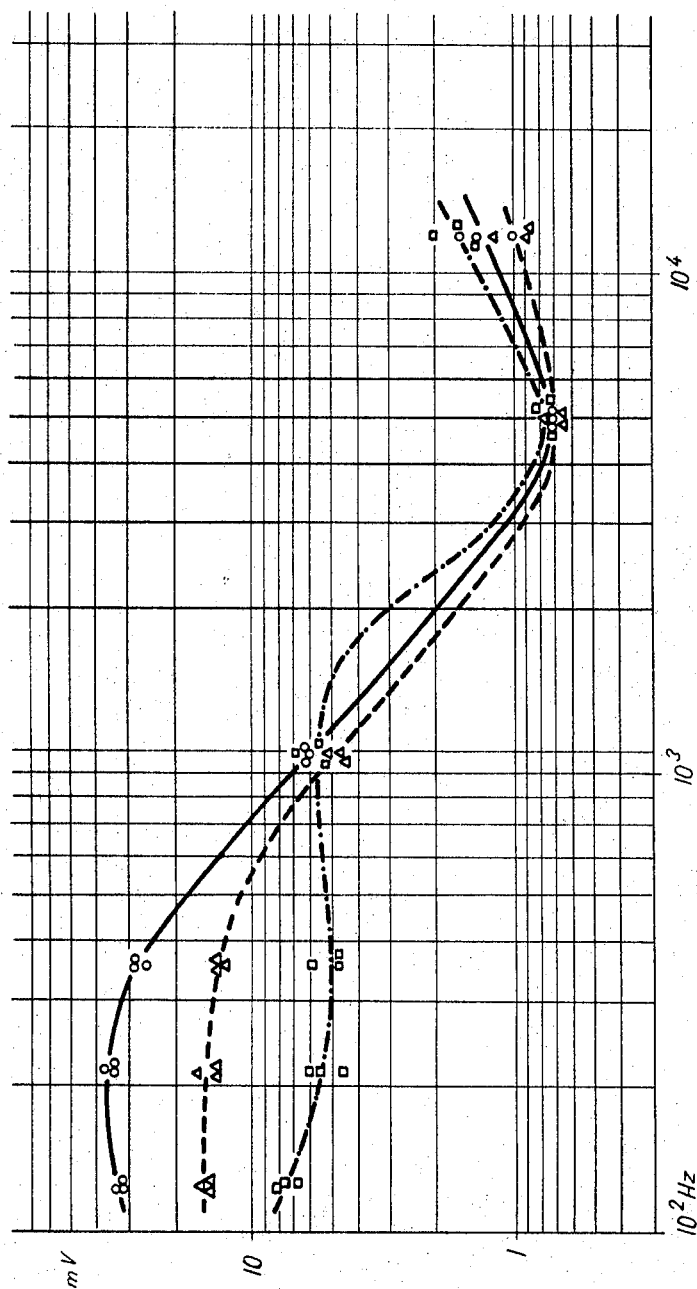
FIG. 3 shows the frequency response curves for three materials as determined in the apparatus of FIGS. 1 and 2.

FIG. 3 graphically illustrates the millivolt readings obtained on the apparatus of FIGS. 1 and 2 when three sheets of polyvinyl chloride of equal thickness, but different plasticizer content were exposed to acoustic oscillations of uniform intensity ranging in frequency from approximately 100 Hz. to more than 10,000 Hz. The sheet having the highest plasticizer content and being rather limp gave the readings indicated in FIG. 3 by circles and connected by a fully drawn curve. The sheet having the lowest plasticizer content and being rather stiff gave readings indicated by squares and connected by a chain-dotted curve. A sheet of intermediate plasticizer content and corresponding suppleness yielded readings indicated by triangles and a broken line.

It is apparent from the graph of FIG. 3 that the apparatus illustrated and described above is most sensitive in distinguishing between sheets of different suppleness when operated at frequencies near 200 Hz. Similar curves were obtained with leather pieces for shoe uppers which differed in their rigidity or suppleness.

The higher harmonics of the frequency at which the driver 4 is excited are cut off by the low-pass filter 8, and it has been found that the filter contributes to the sensitivity of the apparatus and to the reproducibility of the readings obtaind. External noise which might otherwise affect the readings is shut out by the sound absorbing material 30 in the shell 32 which also prevents sound reflection within the shell.

Readings similar to those of FIG. 3 are obtained with oscillations of square and other wave forms.

The apparatus described above permits suppleness readings to be taken quickly and easily on leather, hides, plastic sheets and the like without requiring the cutting of specimens from the tested material. The several portions of a hide or of a large piece of leather can be tested separately to determine the suitability of each portion for an intended purpose, or for determining an average value.

When blanks cut from leather for the manufacture of shoe uppers are inspected for suppleness, the area of the piece of leather exposed to oscillations in the horn 19 should not exceed 100 square centimeters for precise results, and the edges of the piece should be fixedly held between the clamping plates 20, 27.

The method and apparatus of the invention are suitable for sequential routine inspection of a large number of sheet material pieces and for the sequential testing of the same piece in consecutive process stages as during the staking of leather because the measurements are closely reproducible.

The millivoltmeter 10 may be replaced in a conventional manner by a recording instrument. The apparatus illustrated is converted to a go/no-go gage by the installation of relays and colored lights which indicate whether the tested sample meets required suppleness values, and similar modifications, fully familiar in themselves to those skilled in the art, will readily suggest themselves.

It should be understood, therefore, that the foregoing disclosure relates only to preferred embodiments of the invention, and that it is intended to cover all changes and modifications of the example of the invention herein chosen for the purpose of the disclosure which do not depart from the spirit and scope of the invention.

We claim:

1. A method of testing leather and like sheet material having two major faces for suppleness, which comprises:
   (a) exposing one major face of a piece of said sheet material to acoustic oscillations in a first body of fluid, said oscillations having a frequency between 10 and 10,000 cycles per second;
   (b) exposing the other major face of said piece to a second body of fluid separated from said first body, whereby said acoustic oscillations are transmitted to said second body by said piece in attenuated condition; and
   (c) monitoring the attenuated oscillations in said second body.

2. A method as set forth in claim 1, wherein said frequency is approximately 200 cycles per second.

3. A method as set forth in claim 1, wherein said bodies of fluid essentially consist of air.

4. A method as set forth in claim 3, wherein said oscillations in said first body are substantially sinusoidal.

5. An apparatus for testing leather and like sheet material having two opposite major faces for suppleness, comprising, in combination:
   (a) clamping means for holding an edge portion of a tested piece of said sheet material in a fixed position while a portion of each of said faces is exposed;
   (b) first and second wall means defining first and second substantially closed chambers with said exposed portions of said faces respectively;
   (c) an electroacoustical transducer in each of said chambers;
   (d) generating means for generating an alternating voltage operatively connected to the transducer in said first chamber for producing acoustic oscillations in the first chamber; and
   (e) indicating means responsive to an alternating voltage output of the transducer in said second chamber for producing a perceptible indication of said voltage,
      (1) whereby the indicated voltage is a measure of the suppleness of said tested piece.

6. An apparatus as set forth in claim 5, wherein said clamping means include two clamping plate members formed with respective openings therethrough, and means for moving said plate members toward and away from a position in which the plate members are superimposed and said openings thereof are aligned.

7. An apparatus as set forth in claim 5, wherein said clamping means include two clamping members having respective faces extending in substantially parallel planes and formed with respective apertures therethrough transverse of said faces, and actuating means for moving said members toward and away from a position in which said apertures are aligned and said faces are closely juxtaposed for clamping a tested sheet material therebetween while exposed faces of said material extend across said apertures.

8. An apparatus as set forth in claim 7, wherein said first wall means have the shape of an exponential horn directed toward the portion of said face exposed in said chamber.

References Cited

UNITED STATES PATENTS

| | | | |
|---|---|---|---|
| 2,576,423 | 11/1951 | Stewart | 73—67.2 |
| 2,752,781 | 7/1956 | Thorsen | 73—159 |
| 2,844,210 | 7/1958 | Milne | 181—.5 |
| 3,198,007 | 8/1965 | Overton | 73—69 |

LOUIS R. PRINCE, Primary Examiner

J. NOLTON, Assistant Examiner

U.S. Cl. X.R.

181—.5